United States Patent
Katoh et al.

(10) Patent No.: US 12,539,555 B2
(45) Date of Patent: Feb. 3, 2026

(54) FRICTION STIR WELDING DEVICE AND FRICTION STIR WELDING METHOD

(71) Applicant: SHIBAURA MACHINE CO., LTD., Tokyo (JP)

(72) Inventors: Kouichi Katoh, Shizuoka (JP); Hirohiko Matsuzaki, Shizuoka (JP); Toshinao Aoki, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 0 days.

(21) Appl. No.: 18/546,220

(22) PCT Filed: Dec. 22, 2021

(86) PCT No.: PCT/JP2021/047603
§ 371 (c)(1),
(2) Date: Aug. 11, 2023

(87) PCT Pub. No.: WO2022/176387
PCT Pub. Date: Aug. 25, 2022

(65) Prior Publication Data
US 2024/0116130 A1   Apr. 11, 2024

(30) Foreign Application Priority Data
Feb. 17, 2021   (JP) .................................. 2021-023163

(51) Int. Cl.
*B23K 20/00* (2006.01)
*B23K 20/12* (2006.01)

(52) U.S. Cl.
CPC .......... *B23K 20/123* (2013.01); *B23K 20/125* (2013.01); *B23K 20/1255* (2013.01)

(58) Field of Classification Search
CPC .............. B23K 20/1245; B23K 20/126; B23K 20/122; B23K 20/123; B23K 20/125; B23K 20/1255
See application file for complete search history.

(56) References Cited

U.S. PATENT DOCUMENTS

| | | | | |
|---|---|---|---|---|
| 7,866,532 B1 * | 1/2011 | Potter | .................. | B23K 20/126 228/44.5 |
| 2012/0298725 A1 * | 11/2012 | Biggs | .................. | B23K 20/126 228/2.1 |

(Continued)

FOREIGN PATENT DOCUMENTS

| | | |
|---|---|---|
| CN | 106181018 A | 12/2016 |
| CN | 107570860 A | 1/2018 |

(Continued)

OTHER PUBLICATIONS

International Preliminary Report on Patentability for International Application No. PCT/JP2021/047603, mailed Aug. 31, 2023, 11 pages.

(Continued)

Primary Examiner — Erin B Saad
(74) Attorney, Agent, or Firm — DLA Piper LLP (US)

(57) ABSTRACT

A friction stir welding device includes a table that has a placement surface on which a workpiece is to be placed and is rotatable about a table rotation axis intersecting the placement surface, a tool holder movable relative to the table in a direction along the placement surface and rotatable about a holder rotation axis parallel to the table rotation axis, and a welding tool supported by the tool holder and rotating about a tool rotation axis intersecting the holder rotation axis. A control device has a biaxial operation mode in which the welding tool in a rotating state is pressed against a welding portion of a side surface of the workpiece, the welding tool is relatively moved along the welding portion (Continued)

by rotating the table, and the tool holder is rotated so that the welding tool is directed in a normal direction of the welding portion.

4 Claims, 7 Drawing Sheets

(56) References Cited

U.S. PATENT DOCUMENTS

| | | | | |
|---|---|---|---|---|
| 2014/0077668 | A1* | 3/2014 | Morgenstern | B23K 20/1255 228/2.1 |
| 2014/0183246 | A1* | 7/2014 | Saitou | B23K 20/1245 228/2.1 |
| 2017/0297143 | A1* | 10/2017 | Saito | B23K 20/1265 |
| 2018/0161850 | A1* | 6/2018 | Gao | B23K 20/1295 |
| 2020/0114409 | A1* | 4/2020 | Graham | B21D 31/005 |
| 2020/0366152 | A1* | 11/2020 | Lee | B23K 26/0823 |
| 2020/0368854 | A1* | 11/2020 | Kitamura | B23Q 1/525 |
| 2024/0066622 | A1* | 2/2024 | Katoh | B23K 20/1245 |
| 2024/0116130 | A1* | 4/2024 | Katoh | B23K 37/027 |

FOREIGN PATENT DOCUMENTS

| | | |
|---|---|---|
| CN | 108746987 A | 11/2018 |
| DE | 102009060138 A1 | 6/2011 |
| JP | H11128083 A | 5/1999 |
| JP | 2002137070 A | 5/2002 |
| JP | 2004136331 A | 5/2004 |
| JP | 2006068855 A | 3/2006 |
| JP | 2018039016 A | 3/2018 |
| JP | 2019188433 A | 10/2019 |
| JP | 2020-075490 A | 5/2020 |
| JP | 2020069563 A | 5/2020 |
| JP | 2020171957 A | 10/2020 |
| JP | 6787764 | 11/2020 |
| JP | 6787764 B2 | 11/2020 |
| JP | 2021-171776 A | 11/2021 |

OTHER PUBLICATIONS

International Search Report and Written Opinion for International Application No. PCT/JP2021/047603, mailed Mar. 15, 2022, 13 pages.

Office Action for Japanese Patent Application No. 2021-023163, mailed Jan. 28, 2025, 7 pages.

Office Action for Chinese Patent Application No. 202180093448.0, mailed Jun. 19, 2025, 21 pages.

Office Action for Japanese Patent Application No. 2021-023163, mailed Aug. 7, 2025, 1 page.

* cited by examiner

FRICTION STIR WELDING DEVICE AND FRICTION STIR WELDING METHOD

CROSS-REFERENCE TO RELATED APPLICATIONS

This application is a 371 National Stage of PCT/JP2021/047603 filed Dec. 22, 2021, which claims the benefit of Japanese Application No. 2021-023163 filed Feb. 17, 2021. All of the foregoing are incorporated by reference in their entireties.

TECHNICAL FIELD

The present invention relates to a friction stir welding device and a friction stir welding method.

BACKGROUND ART

Friction stir welding is used as a method of welding materials (see, Patent Literature 1).

In Patent Literature 1, a friction stir welding device is constituted by a general-purpose machine tool on which a dedicated attachment and a welding tool are mounted.

With an existing friction stir welding device, for example, a pair of workpieces to be welded are previously arranged in a state where respective upper surfaces are aligned horizontally, and welding is performed along a seam between the workpieces by pressing, against the seam, a welding tool that rotates about an axis orthogonal to the seam and performing friction stirring.

In the friction stir welding device in Patent Literature 1, the welding tool is connected to a main shaft of the machine tool such that rotational force is transferred to the welding tool, and the rotation axis of the welding tool is disposed on the rotation axis of the main shaft.

Meanwhile, an L-shaped attachment in which the rotation axis of a welding tool is disposed to extend in a direction intersecting the rotation axis of a main shaft has been proposed by the present applicant (Japanese Patent Application No. 2020-075490).

In the proposed L-shaped attachment, the welding tool is driven by an air motor or the like incorporated in the attachment, which makes it possible to dispose the rotation axis of the welding tool to extend in the direction intersecting the main shaft and possible to select the direction of the attachment or the welding tool by using the rotation of the main shaft.

With such an L-shaped attachment, it is possible to perform not only friction stir welding of a horizontal upper surface of a workpiece but also friction stir welding of a vertical side surface thereof.

CITATION LIST

Patent Literature

Patent Literature 1: Japanese Patent No. 6787764

SUMMARY OF THE INVENTION

Problems to be Solved by the Invention

When the above-described L-shaped attachment is used to perform friction stir welding of a side surface of a workpiece, the L-shaped attachment is moved along the side surface of the workpiece so as to circle the workpiece while the rotating welding tool is pressed against the side surface of the workpiece in a normal direction. At this time, when the planar contour of the workpiece has a polygonal shape or a curved shape, it is required to adjust the direction of the L-shaped attachment by rotating the main shaft so that the welding tool is constantly in the normal direction with respect to the side surface of the workpiece.

In other words, to perform friction stir welding of a side surface of a workpiece having a polygonal or curved contour by using the L-shaped attachment, it is required to control the horizontal position (XY-axes planar movement) of the L-shaped attachment in accordance with the contour of the workpiece and control the direction (C-axis rotation of the main shaft) of the L-shaped attachment. In particular, for the horizontal position of the L-shaped attachment, cooperative control for the X-axis and the Y-axis of the machine tool with respect to a curve is required, which inevitably makes control complicated.

An object of the invention is to provide a friction stir welding device and a friction stir welding method capable of easily performing friction stir welding of a side surface of a workpiece having a polygonal or curved contour.

Means for Solving the Problems

A friction stir welding device according to an aspect of the invention includes: a table that has a placement surface on which a workpiece is to be placed and that is rotatable about a table rotation axis intersecting the placement surface; a tool holder that is movable relative to the table in a direction along the placement surface and that is rotatable about a holder rotation axis parallel to the table rotation axis; a welding tool that is supported by the tool holder and that is configured to rotate about a tool rotation axis intersecting the holder rotation axis; and a control device configured to control an operation of each of the table, the tool holder, and the welding tool, the control device having a biaxial operation mode in which the welding tool in a rotating state is pressed against a welding portion of a side surface of the workpiece, the welding tool is relatively moved along the welding portion by rotating the table, and the tool holder is rotated so that the welding tool is directed in a normal direction of the welding portion.

In such an aspect of the invention, welding of a side surface of a workpiece can be performed by the welding tool that is supported by the tool holder and that is configured to rotate about the tool rotation axis intersecting the holder rotation axis, in other words, by the welding tool that is mounted on the so-called L-shaped tool holder.

It is possible in welding to cause the welding portion of the side surface of the workpiece to face the welding tool by the rotation of the table, and possible to simplify the operation of moving the tool holder along the side surface of the workpiece. At this time, rotating the tool holder so that the welding tool is directed in the normal direction of the welding portion enables the welding tool to perform appropriate friction stir welding on the workpiece.

Therefore, according to the aspect of the invention, it is possible to easily perform friction stir welding of a side surface of a workpiece having a polygonal or curved contour.

The control device may have, in addition to the above-described biaxial operation mode in which each of the table and the tool holder is rotated, a uniaxial operation mode in which, with the table stopped, the tool holder is rotated while being moved along the side surface of the workpiece.

In the friction stir welding device according to the aspect of the invention, the control device preferably includes: a tool rotation controller configured to control a rotation of the welding tool with respect to the tool holder; a tool position controller configured to control a position of the tool holder in the direction along the placement surface; a tool direction controller configured to control a direction of the tool holder about the holder rotation axis; a workpiece direction controller configured to control a direction of the table about the table rotation axis, and a welding controller configured to actuate, based on information on a shape of the workpiece, the tool rotation controller, the tool position controller, the tool direction controller, and the workpiece direction controller to control a welding operation in the biaxial operation mode.

In such an aspect of the invention, an operation in the biaxial operation mode in accordance with the shape of the side surface of the workpiece is performed under control by the welding controller. Specifically, the tool holder is fixed at a predetermined position in the direction along the placement surface by the tool position controller and the welding portion of the workpiece is made to face the welding tool of the tool holder by rotating the table by the workpiece direction controller. Then, the welding tool is directed in the normal direction of the welding portion by rotating the tool holder by the tool direction controller. In this state, the rotation of the welding tool is controlled appropriately by the tool rotation controller, which enables the welding tool to perform friction stir welding on the welding portion of the side surface of the workpiece.

In the welding operation, rotating the table by the workpiece direction controller may sequentially move the welding tool along the welding portion of the workpiece. At this time, appropriate friction stir welding can be maintained by causing the tool position controller to maintain the welding tool at an appropriate depth with respect to the welding portion of the workpiece and causing the tool direction controller to adjust the direction of the tool holder to constantly direct the welding tool in the normal direction of the welding portion.

In the friction stir welding device according to the aspect of the invention, it is preferable that: the table be installed in a machine tool; the tool holder be mounted on a main shaft of the machine tool, be rotatable about the holder rotation axis by a rotation of the main shaft, and be adjustable in terms of a position thereof in the direction along the placement surface by a movement of the main shaft with respect to the table; and a rotary driver configured to rotate the welding tool be installed in the tool holder.

In such an aspect of the invention, it is possible to provide the friction stir welding device according to the aspect of the invention by using a general-purpose machine tool.

A friction stir welding method according to another aspect of the invention, which uses a friction stir welding device including: a table that has a placement surface on which a workpiece is to be placed and that is rotatable about a table rotation axis intersecting the placement surface; a tool holder that is movable relative to the table in a direction along the placement surface and that is rotatable about a holder rotation axis parallel to the table rotation axis; and a welding tool that is supported by the tool holder and that is configured to rotate about a tool rotation axis intersecting the holder rotation axis, includes pressing the welding tool in a rotating state against a welding portion of a side surface of the workpiece, moving the welding tool along the welding portion by rotating the table, and rotating the tool holder so that the welding tool is directed in a normal direction of the welding portion.

The friction stir welding method according to such another aspect of invention provides effects such as those described with the friction stir welding device described above.

According to the invention, it is possible to provide a friction stir welding device and a friction stir welding method capable of easily performing friction stir welding of a side surface of a workpiece having a polygonal or curved contour.

DESCRIPTION OF EMBODIMENTS

One exemplary embodiment of the invention will be described below with reference to the drawings.

Figure 1:
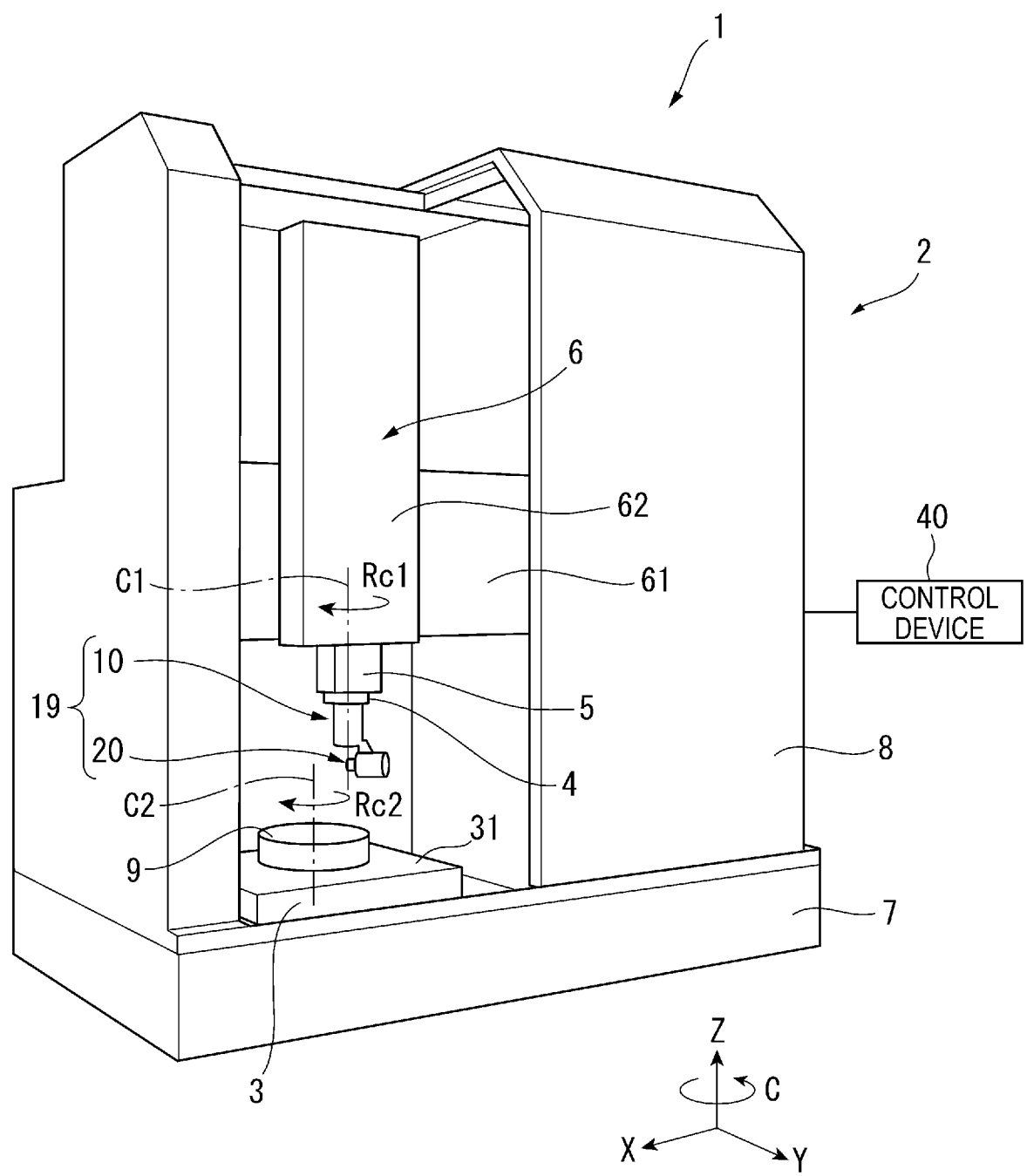
FIG. 1 is a perspective view illustrating a friction stir welding device that is one exemplary embodiment of the invention.

In FIG. 1, a friction stir welding device 1 in the present exemplary embodiment is constituted by a general-purpose machine tool 2 having a vertical main shaft and on which an L-shaped tool holder 10 and a welding tool 20 for friction stir welding are mounted. The welding tool 20 mounted on the tool holder 10 constitutes a friction stir welding head 19.

The machine tool 2 includes a table 3 that has a placement surface 31 to which a workpiece 9 is to be fixed; a main shaft 4 that has a tip on which a tool is mountable; a main shaft head 5 that supports the main shaft 4 rotatably; and a moving mechanism 6 that moves the main shaft head 5 to an optional position.

The table 3, the main shaft 4, the main shaft head 5, and the moving mechanism 6 are each installed on an upper surface of a bed 7, and the entirety thereof can be surrounded by an openable and closable cover 8.

The main shaft 4 is supported to be rotatable about an axis (holder rotation axis C1) in the Z-axis direction, can rotate (rotation operation Rc1) by being driven by a drive motor inside the main shaft head 5, and can stop at a designated angular position.

Therefore, the tool holder 10 and the welding tool 20 mounted on the tip of the main shaft 4 can be set in an optional direction by the rotation (rotation operation Rc1) of the main shaft 4 about the holder rotation axis C1.

The moving mechanism 6 includes a slider 62 that is supported by a horizontal guide bar 61, and the main shaft head 5 is supported by the slider 62 to face downward. It is possible by raising/lowering the main shaft head 5 with respect to the slider 62 to move the tip of the main shaft 4 to a designated position in the Z-axis direction. In addition, it is possible by moving the slider 62 along the guide bar 61 to move the tip of the main shaft 4 to a designated position in the X-axis direction. The moving mechanism 6 further includes a Y-axis moving mechanism that moves the table 3 in the Y-axis direction and can relatively move the table 3 and the tip of the main shaft 4 to a predetermined position in the Y-axis direction.

Therefore, the tool holder 10 mounted on the tip of the main shaft 4 is relatively movable with respect to the table 3 in the direction of the XYZ axes by the moving mechanism 6, and the position of the welding tool 20 with respect to the workpiece 9 is adjustable.

The table 3 is supported such that the placement surface 31 extends in a planar direction along the X-axis and the Y-axis and such that the table 3 is rotatable about an axis (table rotation axis C2) in the Z-axis direction orthogonal to the placement surface 31. The table 3 can be rotated (rotation operation Rc2) by being driven by a drive motor inside the bed 7 and can stop at a designated angular position.

Therefore, it is possible by rotating (rotation operation Rc2) the table 3 in a state where the tool holder 10 and the welding tool 20 that are mounted on the main shaft 4 are disposed beside the workpiece 9 to cause an optional portion of the workpiece 9 to face the welding tool 20.

Figure 2:
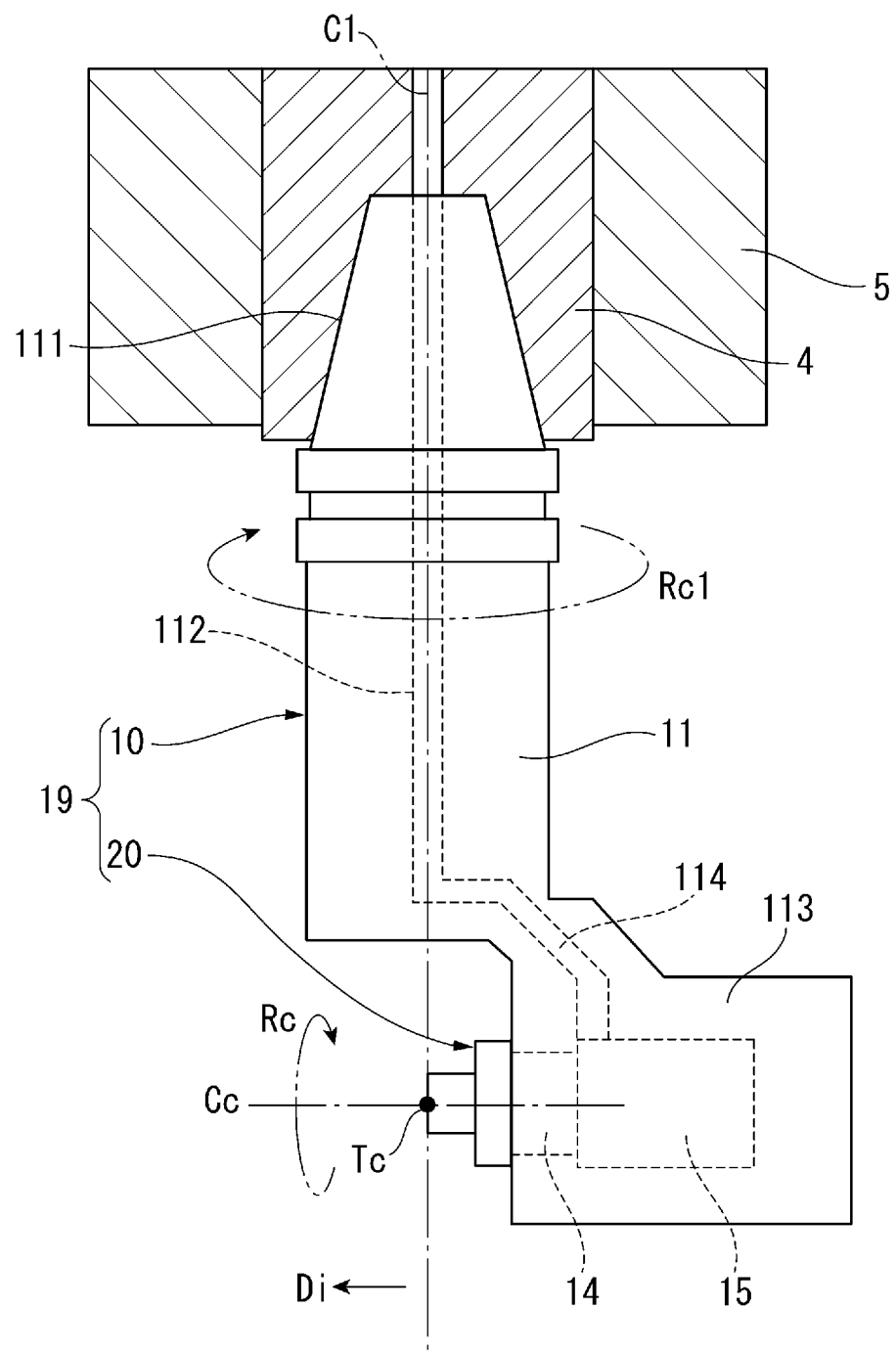
FIG. 2 is a side view illustrating a tool holder and a welding tool in the exemplary embodiment.

In FIG. 2, the L-shaped tool holder 10 includes a body 11 that is mounted on the main shaft 4 of the machine tool 2, a machining shaft 14 that is rotatably supported and that has a tip on which the welding tool 20 can be mounted, and a rotary driver 15 that rotationally drives the machining shaft 14.

The body 11 can be mounted on the main shaft 4 by a tapered shank 111 complying with the standard and has a center through hole 112 along the axis of the body 11, and center through air can be supplied from the main shaft 4 into the center through hole 112. When mounted on the main shaft 4, the body 11 has an axis coaxial with the rotational center (holder rotation axis C1) of the main shaft 4.

The body 11 includes, on the side opposite to the tapered shank 111, an extension portion 113 that projects in a direction intersecting the axis of the body 11. An extension air passage 114 in communication with the center through hole 112 is formed in the extension portion 113, and driving-air can be supplied from the center through hole 112 to the rotary driver 15 through the extension air passage 114.

To form the L-shaped tool holder 10, the machining shaft 14 on which the welding tool 20 is mounted is formed to be rotatable (rotation operation Rc) about an axis (tool rotation axis Cc) orthogonal to the holder rotation axis C1.

A tip Tc, which is a machining portion of the welding tool 20 mounted on the machining shaft 14, is disposed on the axis of the holder rotation axis C1.

The rotary driver 15 includes a plurality of air motors that are rotated by driving-air supplied from the outside. By supplying the center through air from the main shaft 4 to the rotary driver 15 through the center through hole 112, the machining shaft 14 and the welding tool 20 are rotationally driven (rotation operation Rc) by the rotary driver 15, and friction stir welding with respect to a side surface or the like of the workpiece 9 can be performed by the welding tool 20.

Further, by rotating (rotation operation Rc1) the tool holder 10 by the main shaft 4 in accordance with the direction of the side surface of the workpiece 9, a direction Di (the direction of the tool rotation axis Cc) of the welding tool 20 can be changed.

With such an L-shaped tool holder 10, friction stir welding by the welding tool 20 can be performed with respect to a side surface of the workpiece 9.

Figure 3:
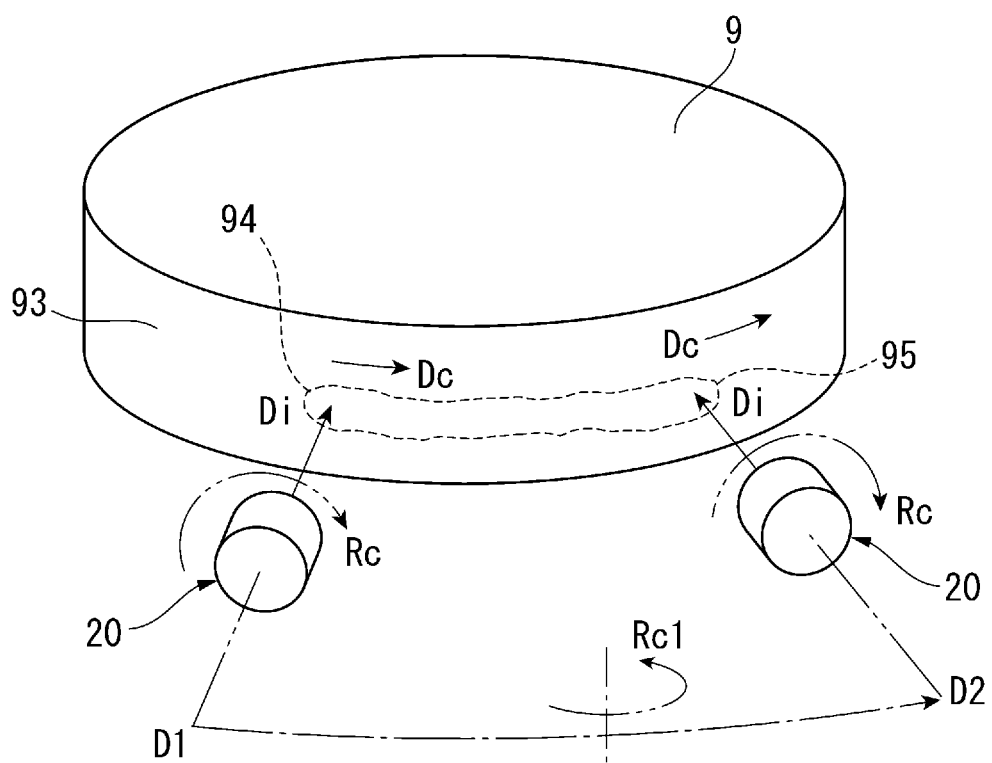
FIG. 3 is a perspective view illustrating an operation of welding a side surface of a workpiece in the exemplary embodiment.

In FIG. 3, when friction stir welding of a side surface 93 of the workpiece 9 having a cylindrical shape is to be performed from a start position 94 to an end position 95, the tool holder 10 is moved along the side surface 93 in a state where the welding tool 20 is rotating, and the direction of the tool holder 10 and the direction Di of the welding tool 20 are changed so that the welding tool 20 becomes in a direction orthogonal to the side surface 93 according to the movement.

First, a welding operation is started at a position D1 by advancing the welding tool 20 in the direction Di while rotating (rotation operation Rc) the welding tool 20, and, at the start position 94, pushing the welding tool 20 into the workpiece 9. Then, moving (position control for the welding tool 20) the welding tool 20 in a traveling direction Dc and retracting the welding tool 20 when the welding tool 20 reaches a position D2. Accordingly, friction stir welding from the start position 94 to the end position 95 can be performed.

At this time, the tool holder 10 is rotated (rotation operation Rc1) by the main shaft 4 to cause the direction Di to be orthogonal to the surface of the side surface 93 (direction control for the welding tool 20). This causes the welding tool 20 to be constantly in a direction orthogonal to the side surface 93, resulting in appropriate friction stir welding for the side surface 93 of the cylindrical workpiece 9.

Referring back to FIG. 1, a control device 40 in which a computer system is used is connected to the machine tool 2.

The control device 40 performs operation control for respective parts, including the machine tool 2, of the friction stir welding device 1. Specifically, the control device 40 can perform rotation control for the main shaft 4 (direction control for the welding tool 20), movement control for the moving mechanism 6 (position control for the welding tool 20), and rotation control for the table 3 (direction control for the workpiece 9).

Figure 4:
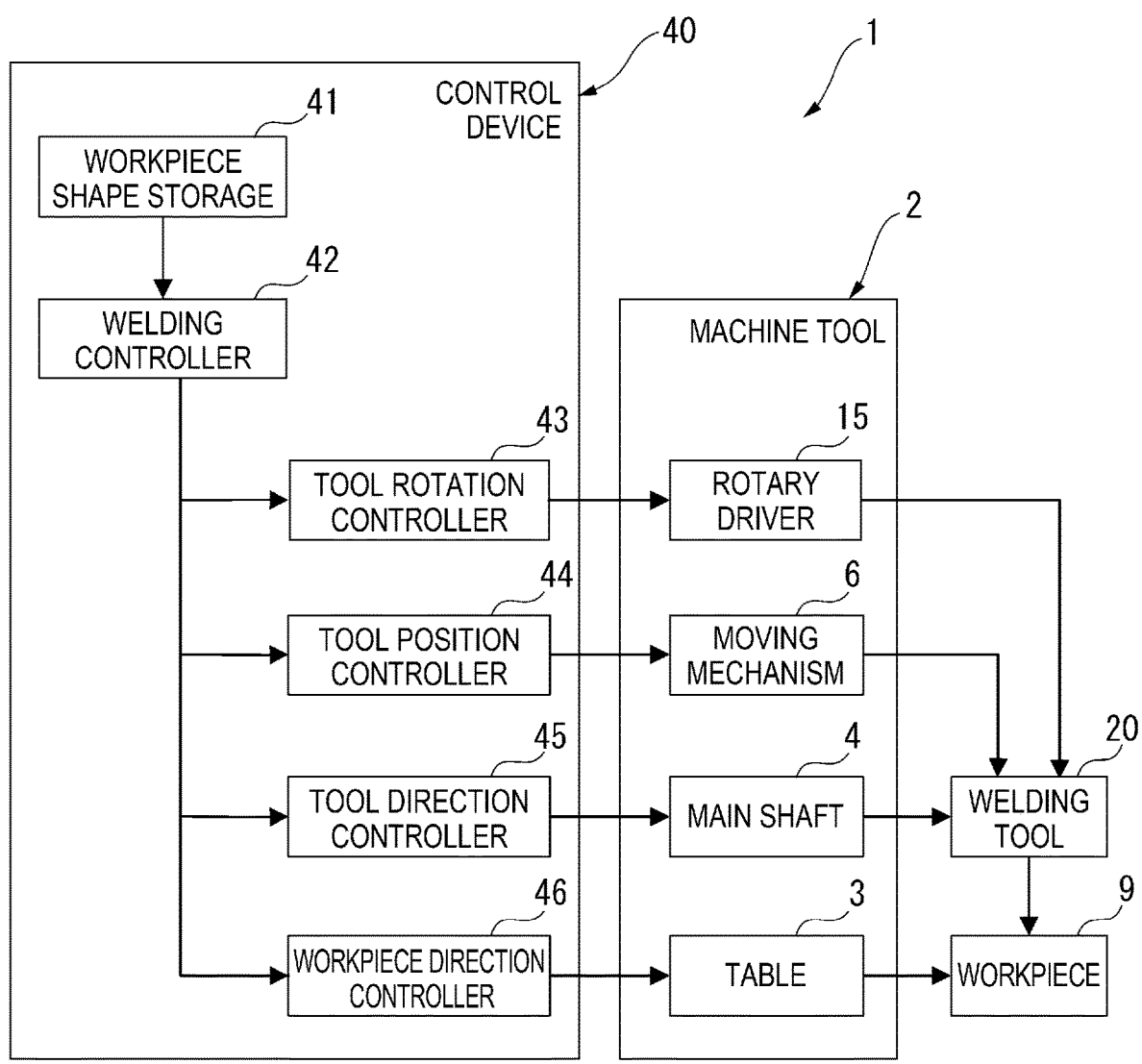
FIG. 4 is a block diagram illustrating a control device in the exemplary embodiment.

In FIG. 4, the control device 40 includes a workpiece shape storage 41 that stores information on the shape of the workpiece 9, and a welding controller 42 that controls, on the basis of the information on the shape of the workpiece 9, the welding operation performed by the welding tool 20.

A tool rotation controller 43, a tool position controller 44, a tool direction controller 45, and a workpiece direction controller 46 are connected to the welding controller 42.

The tool rotation controller 43 controls the rotation of the welding tool 20 with respect to the tool holder 10. Specifically, the tool rotation controller 43 controls the center through air supplied from the main shaft 4 to the rotary driver 15 of the tool holder 10, thereby controlling the start and stop of the rotation and the rotation speed of the machining shaft 14 and the welding tool 20.

The tool position controller 44 controls the position of the tool holder in a direction along the placement surface 31 (horizontal direction including the X-axis and the Y-axis). Specifically, the tool position controller 44 controls the moving mechanism 6 to adjust the XYZ-axes relative positions of the welding tool 20 and the workpiece 9. In particular, when welding of a side surface of the workpiece 9 is to be performed, the welding tool 20 is disposed to face a weld portion of the side surface of the workpiece 9 at the start of a welding operation, and, during the welding operation, the relative positions of the workpiece 9 and the welding tool 20 are adjusted on the basis of the side surface shape (contour shape of the workpiece 9 in plan view) of the workpiece 9.

The tool direction controller 45 controls the direction of the tool holder about the holder rotation axis C1. Specifically, on the basis of the current position of the tool holder 10, the current angular position of the table 3, and the side surface shape of the workpiece 9, the main shaft 4 is rotated so that the direction Di of the welding tool 20 is in a direction orthogonal to the weld portion of the side surface of the workpiece 9.

The workpiece direction controller 46 controls the direction of the table 3 about the table rotation axis C2. Specifically, on the basis of the current position of the tool holder 10, the current angular position of the table 3, and the side surface shape of the workpiece 9, the table 3 is rotated so that the weld portion of the side surface of the workpiece 9 faces the welding tool 20.

On the basis of the information on the shape of the workpiece 9 stored in the workpiece shape storage 41, the welding controller 42 actuates the tool rotation controller 43, the tool position controller 44, the tool direction controller 45, and the workpiece direction controller 46, causing the welding tool 20 to perform a welding operation of the side surface of the workpiece 9.

As control procedures of the welding operation on the side surface of the workpiece 9 by the welding tool 20, the welding controller 42 has a uniaxial operation mode in which, with the table 3 fixed, the tool holder 10 is rotated while being moved along the side surface of the workpiece 9 and a biaxial operation mode in which each of the tool holder 10 and the table 3 is rotated.

Figure 5:
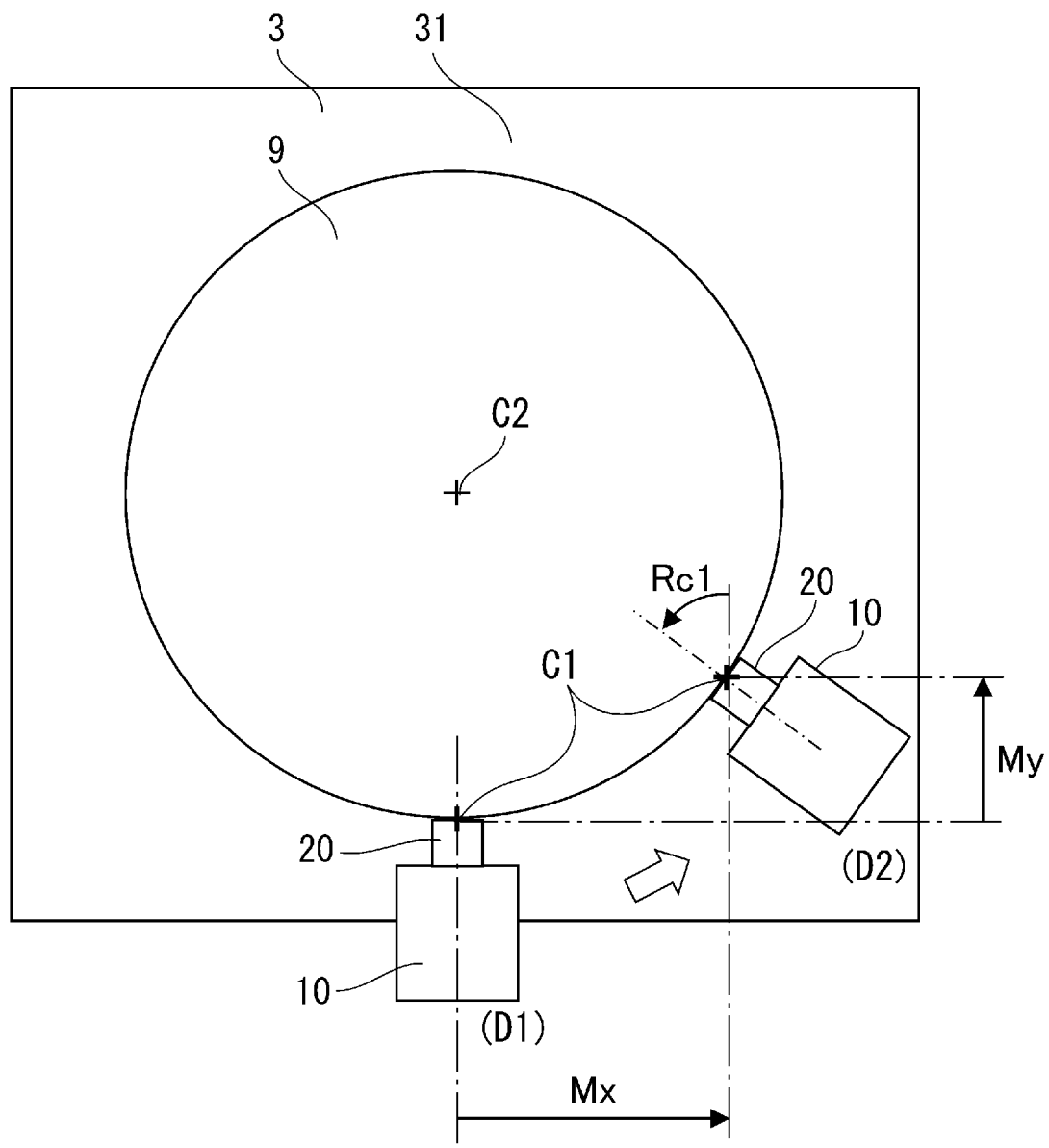
FIG. 5 is a plan view illustrating a uniaxial operation mode with respect to a circular workpiece in the exemplary embodiment.

In FIG. 5, with the table 3 stopped, an operation of moving the tool holder 10 along the side surface of the workpiece 9 is performed in the uniaxial operation mode.

Before the welding operation, the workpiece 9 is placed on the placement surface 31 of the table 3 in a state where the table 3 is fixed at a fixed position. Next, the welding controller 42 causes the tool position controller 44 to actuate and cause the moving mechanism 6 to move and dispose the tool holder 10 at the position D1 on the side surface of the workpiece 9. Then, the welding controller 42 causes the tool direction controller 45 to rotate the main shaft 4, causing the tip of the welding tool 20 to face the side surface of the workpiece 9.

In the welding operation, while welding of the side surface of the workpiece 9 is performed by actuating the rotary driver 15 by the tool rotation controller 43 and rotating the welding tool 20, the tool holder 10 is moved from the position D1 to the position D2 by actuating the moving mechanism 6 by the tool position controller 44.

At the time of the moving, the tool position controller 44 performs cooperative control for a movement Mx of the tool holder 10 in the X-axis direction and a movement My of the tool holder 10 in the Y-axis direction, whereby the tip of the welding tool 20 is moved along the side surface of the workpiece 9. In addition, under the control by the tool direction controller 45, the welding tool 20 is maintained in a direction orthogonal to the weld portion of the side surface of the workpiece 9 by the rotation operation Rc1 of the tool holder 10 about the holder rotation axis C1.

A weld mark extending from the position D1 to the position D2 in the horizontal direction is thus formed on the side surface of the workpiece 9.

In contrast to such a uniaxial operation mode, in the biaxial operation mode, the welding tool 20 in a rotating state is pressed against a welding portion of the side surface of the workpiece 9, the welding tool 20 is relatively moved along the welding portion by rotating the table 3, and the tool holder 10 is rotated so that the welding tool 20 is directed in a normal direction of the welding portion.

Figure 6:
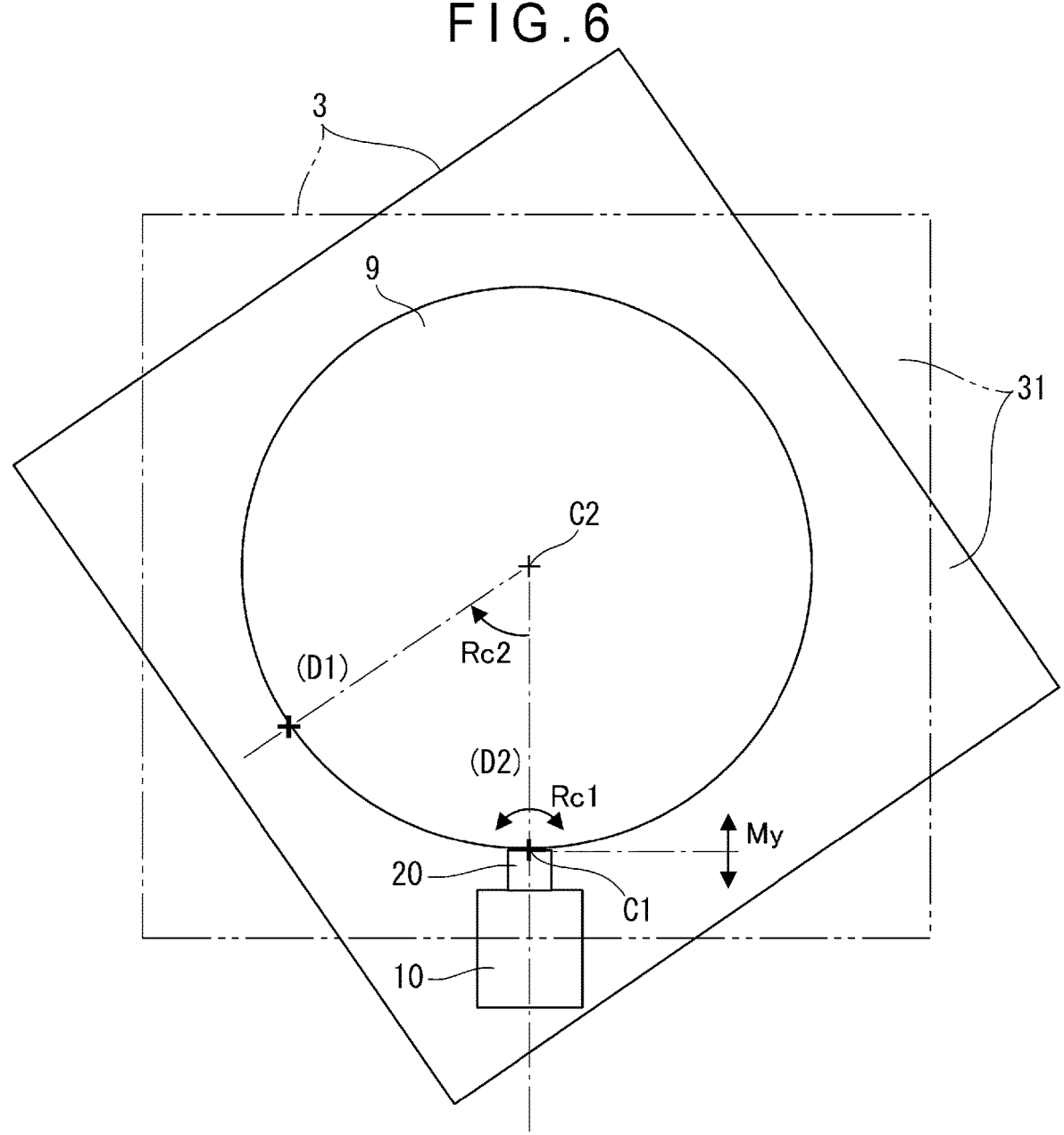
FIG. 6 is a plan view illustrating a biaxial operation mode with respect to a circular workpiece in the exemplary embodiment.

In FIG. 6, when the contour of the workpiece 9 is circular and the center thereof is at the table rotation axis C2 in the biaxial operation mode, an operation of setting the tool holder 10 at a fixed position and rotating each of the tool holder 10 and the table 3 are performed.

Before the welding operation, the workpiece 9 is placed on the placement surface 31 of the table 3 in a state where the table 3 is fixed at a fixed position. Next, the welding controller 42 causes the tool position controller 44 to actuate and cause the moving mechanism 6 to move and dispose the tool holder 10 at the position D1 on the side surface of the workpiece 9. Then, the welding controller 42 causes the tool direction controller 45 to rotate the main shaft 4, causing the tip of the welding tool 20 to face the side surface of the workpiece 9.

In the welding operation, while welding of the side surface of the workpiece 9 is performed by actuating the rotary driver 15 by the tool rotation controller 43 and rotating the welding tool 20, the table 3 is actuated by the workpiece direction controller 46, and the tool holder 10 is moved from the position D1 to the position D2 relative to the workpiece 9 by the rotation operation Rc2 of the table 3 about the table rotation axis C2.

At the time of the relative movement, the main shaft 4 is rotated by the tool direction controller 45, and the welding tool 20 is maintained in a direction orthogonal to the weld portion of the side surface of the workpiece 9 by the rotation operation Rd of the tool holder 10 about the holder rotation axis C1.

A weld mark extending from the position D1 to the position D2 in the horizontal direction is thus formed on the side surface of the workpiece 9.

The relative movement of the tool holder 10 and the workpiece 9 is performed by the rotation operation Rc2 of the table 3. During the relative movement, the tool position controller 44 basically does not move the tool holder 10. However, for example, when the center of the workpiece 9 and the table rotation axis C2 are shifted from each other or when the side surface of the workpiece 9 is uneven, the tip of the welding tool 20 may follow the side surface of the workpiece 9 through the movement My in the Y-axis direction.

Figure 7:
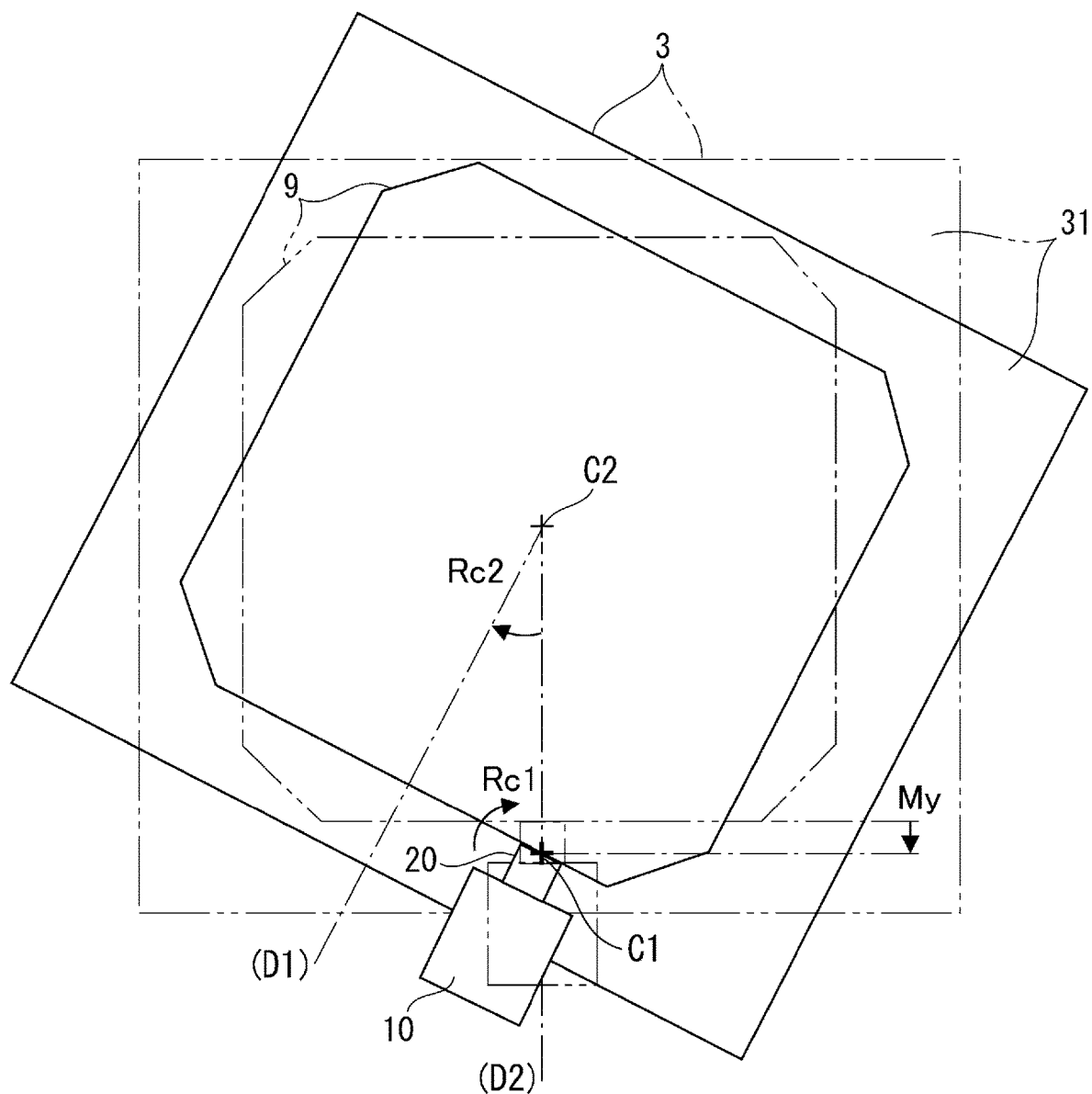
FIG. 7 is a plan view illustrating a biaxial operation mode with respect to a polygonal workpiece in the exemplary embodiment.

In FIG. 7, in the biaxial operation mode, when the contour of the workpiece 9 in plan view has a shape other than a circular shape, such as a polygonal shape or when the workpiece 9 is circular but has the center that is shifted from the table rotation axis C2, an operation of causing the tool holder to approach and separate with respect to the workpiece 9 is performed with rotation of each of the tool holder 10 and the table 3.

Before the welding operation, the workpiece 9 is placed on the placement surface 31 of the table 3 in a state where the table 3 is fixed at a fixed position. Next, the welding controller 42 causes the tool position controller 44 to actuate and cause the moving mechanism 6 to move and dispose the tool holder 10 at the position D1 on the side surface of the workpiece 9. Then, the welding controller 42 causes the tool direction controller 45 to rotate the main shaft 4, causing the tip of the welding tool 20 to face the side surface of the workpiece 9.

In the welding operation, while welding of the side surface of the workpiece 9 is performed by actuating the rotary driver 15 by the tool rotation controller 43 and rotating the welding tool 20, the table 3 is actuated by the workpiece direction controller 46, and the tool holder 10 is moved from the position D1 to the position D2 relative to the workpiece 9 by the rotation operation Rc2 of the table 3 about the table rotation axis C2.

At the time of the relative movement, the tool position controller 44 causes the moving mechanism 6 to perform the movement My of the tool holder 10 in the Y-axis direction in accordance with a distance of a portion of the side surface of the workpiece 9 on which the welding tool 20 performs welding from the table rotation axis C2, to hold the tip of the welding tool 20 at an appropriate depth relative to the side surface of the workpiece 9. In addition, the main shaft 4 is rotated by the tool direction controller 45, and the welding tool 20 is maintained in the direction orthogonal to the weld portion of the side surface of the workpiece 9 by the rotation operation Rc1 of the tool holder 10 about the holder rotation axis C1.

With the progress of the welding operation, the workpiece 9 is rotated about the table rotation axis C2, and the distance of the side surface of the workpiece 9 from the table rotation axis C2 is thereby changed. In response to this change, the tool position controller 44 causes the moving mechanism 6 to perform the movement My in the Y-axis direction. In addition, the tool direction controller 45 performs the rotation operation Rc1 of the welding tool 20 about the holder rotation axis C1 to maintain an appropriate state of the welding tool 20 with respect to the side surface of the workpiece 9, resulting in appropriate welding.

A weld mark extending from the position D1 to the position D2 in the horizontal direction is thus formed on the side surface of the workpiece 9.

According to the friction stir welding device 1 in the present exemplary embodiment, the following effects are obtained.

In the present exemplary embodiment, welding of the side surface of the workpiece 9 can be performed by the welding tool 20 that is supported by the tool holder 10 and that rotates about the tool rotation axis Cc intersecting the holder rotation axis C1, in other words, by the welding tool 20 that is mounted on the so-called L-shaped tool holder 10.

It is possible in welding to cause the welding portion of the side surface of the workpiece 9 to face the welding tool 20 by the rotation of the table 3, and possible to simplify the operation of moving the tool holder 10 along the side surface of the workpiece 9. At this time, rotating the tool holder so that the welding tool 20 is directed in the normal direction of the welding portion enables the welding tool 20 to perform appropriate friction stir welding on the workpiece 9.

It is thus possible to easily perform, in the present exemplary embodiment, friction stir welding of the side surface of the workpiece 9, including a workpiece having a polygonal or curved contour.

In the present exemplary embodiment, under the control by the welding controller 42, it is possible to perform an operation in the biaxial operation mode in accordance with the shape of the side surface of the workpiece 9 (the contour shape of the workpiece 9 in plan view).

Specifically, it is possible to fix the tool holder 10 at a predetermined position in the direction along the placement surface 31 by the tool position controller 44 and possible to cause the welding portion of the workpiece 9 to face the welding tool 20 of the tool holder 10 by rotating the table 3 by the workpiece direction controller 46. Then, it is possible to direct the welding tool to be in the normal direction of the welding portion by rotating the tool holder 10 by the tool direction controller 45. In this state, the rotation of the welding tool 20 is controlled appropriately by the tool rotation controller 43, which enables the welding tool 20 to perform friction stir welding on the welding portion of the side surface of the workpiece 9.

In the welding operation, rotating the table 3 by the workpiece direction controller 46 may sequentially move the welding tool 20 along the welding portion of the workpiece 9. At this time, appropriate friction stir welding can be maintained by causing the tool position controller 44 to maintain the welding tool 20 at an appropriate depth with respect to the welding portion of the workpiece 9 and causing the tool direction controller 45 to adjust the direction of the tool holder 10 to constantly direct the welding tool 20 in the normal direction of the welding portion.

In the configuration in the present exemplary embodiment, the table 3 is installed in the machine tool 2, the tool holder 10 is mounted on the main shaft 4 of the machine tool 2 and is able to be rotated about the holder rotation axis C1 by the rotation of the main shaft 4, the position of the tool holder 10 in a direction along the placement surface 31 (the X-axis direction and the Y-axis direction) is adjustable by the movement of the main shaft 4 with respect to the table 3, and the rotary driver 15 that rotates the welding tool 20 is installed in the tool holder 10. The friction stir welding device 1 is thus achieved by using the general-purpose machine tool 2.

Note that the invention is not limited to the exemplary embodiment described above and the invention includes modifications and the like within a range in which the object of the invention can be achieved.

In the above exemplary embodiment, the uniaxial operation mode (see FIG. 5) and the biaxial operation mode (see FIG. 6 and FIG. 7) are selectable in the control device 40. The control device 40, however, may have only the biaxial operation mode where a weld portion is fed by the rotation of the table 3 about the table rotation axis C2 constantly.

In the above exemplary embodiment, the path for welding of the side surface of the workpiece 9 is fixed in the Z-axis direction. However, when the path for welding of the side surface of the workpiece 9 changes in the Z-axis direction, the position of the welding tool 20 in the Z-axis direction can be adjusted by the moving mechanism 6 with the progress of a weld portion by the welding tool 20.

In the above exemplary embodiment, the machine tool 2 in which the placement surface 31 of the table 3 is in the horizontal direction (the X-axis and the Y-axis) and the main shaft 4 is disposed along the vertical Z-axis is used. However, a machine tool in which the placement surface 31 of the table 3 is vertical and the main shaft 4 extends horizontally may be used.

In the above exemplary embodiment, the cooperative operation in the biaxial operation mode uses the holder rotation axis C1 and the table rotation axis C2 (C-axis rotation about the vertical Z-axis for each axis). However, these may be rotation axes A1 and A2 about the X-axis or rotation axes B1 and B2 about the Y-axis.

In the friction stir welding device 1 in the above exemplary embodiment, the L-shaped tool holder 10 is mounted on the machine tool 2 to perform welding of the side surface of the workpiece 9. However, it is also possible to perform welding of the upper surface of the workpiece 9 by detaching the L-shaped tool holder 10 and replacing the L-shaped tool holder with a straight tool holder.

The invention claimed is:

1. A friction stir welding device comprising:
a table comprising a placement surface configured to have a workpiece placed thereon and that is rotatable about a table rotation axis intersecting the placement surface;
a tool holder that is movable relative to the table in a direction along the placement surface and that is rotatable about a holder rotation axis parallel to the table rotation axis, the tool holder comprising a machining shaft configured to rotate about a tool rotation axis intersecting the holder rotation axis;
a welding tool mounted on a tip of the machining shaft, the welding tool being supported by the tool holder and that is configured to rotate about the tool rotation axis intersecting the holder rotation axis, the welding tool comprising a machining portion, which is a tip of the welding tool, and which is disposed at a location on the holder rotation axis; and
a control device configured to control an operation of each of the table, the tool holder, and the welding tool,
the control device having a biaxial operation mode in which the welding tool in a rotating state is pressed against a welding portion of a side surface of the workpiece, the welding tool is relatively moved along the welding portion by rotating the table, and the tool holder is rotated so that the welding tool is directed in a normal direction of the welding portion.

2. The friction stir welding device according to claim 1, wherein
the control device comprises:
a tool rotation controller configured to control a rotation of the welding tool with respect to the tool holder;
a tool position controller configured to control a position of the tool holder in the direction along the placement surface;
a tool direction controller configured to control a direction of the tool holder about the holder rotation axis;
a workpiece direction controller configured to control a direction of the table about the table rotation axis, and
a welding controller configured to actuate, based on information on a shape of the workpiece, the tool rotation controller, the tool position controller, the tool direction controller, and the workpiece direction controller to control a welding operation in the biaxial operation mode.

3. The friction stir welding device according to claim 1, wherein
the table is installed in a machine tool,
the tool holder is mounted on a main shaft of the machine tool, is rotatable about the holder rotation axis by a rotation of the main shaft, and is adjustable in terms of a position thereof in the direction along the placement surface by a movement of the main shaft with respect to the table, and
a rotary driver configured to rotate the welding tool is installed in the tool holder.

4. The friction stir welding device according to claim 2, wherein
the table is installed in a machine tool,
the tool holder is mounted on a main shaft of the machine tool, is rotatable about the holder rotation axis by a rotation of the main shaft, and is adjustable in terms of a position thereof in the direction along the placement surface by a movement of the main shaft with respect to the table, and
a rotary driver configured to rotate the welding tool is installed in the tool holder.

* * * * *